United States Patent [19]
Hirama et al.

[11] Patent Number: 6,028,299
[45] Date of Patent: Feb. 22, 2000

[54] LINEAR IMAGE SENSOR DEVICE COMPRISING FIRST AND SECOND LINEAR IMAGE SENSOR SECTIONS HAVING FIRST AND SECOND SENSITIVITIES

[75] Inventors: Masahide Hirama; Yoshinori Kuno; Tadakuni Narabu, all of Kanagawa, Japan

[73] Assignee: Sony Corporation, Tokyo, Japan

[21] Appl. No.: 08/752,375

[22] Filed: Dec. 4, 1996

[30] Foreign Application Priority Data

Dec. 5, 1995 [JP] Japan .............................. P07-316322

[51] Int. Cl.[7] .......................... H01N 1/04; H01L 27/148
[52] U.S. Cl. ...................... 250/208.1; 250/234; 358/483; 358/496
[58] Field of Search ............................... 250/208.1, 208.2, 250/234, 235, 559.03, 559.05, 559.06, 559.07, 559.08; 358/471, 474, 482, 483, 486, 494, 513, 514, 496, 497; 348/229, 230, 297, 298

[56] References Cited

U.S. PATENT DOCUMENTS

| | | | |
|---|---|---|---|
| 5,101,108 | 3/1992 | Gaalema et al. | 250/332 |
| 5,221,848 | 6/1993 | Milch | 250/208.1 |
| 5,267,335 | 11/1993 | Mita | 250/208.1 |
| 5,416,611 | 5/1995 | Tandon | 358/474 |
| 5,550,651 | 8/1996 | Terajima | 358/496 |
| 5,585,620 | 12/1996 | Nakamura et al. | 250/208.1 |

*Primary Examiner*—John R. Lee
*Attorney, Agent, or Firm*—Hill & Simpson

[57] ABSTRACT

A linear image sensor device with at least two lines including linear sensors 10, 20, which device is capable of showing a wide dynamic range. In the linear image sensor device, one linear sensor 10 is made to have a high sensitivity, while the other linear sensor 20 is made to have a low sensitivity. The linear sensors are respectively equipped with readout gates 13, 23 for reading out charges from sensor arrays 12, 22 comprising a number of pixels and CCD analog shift registers 14, 24 for transferring the charges read out. In the other linear sensor 20, analog memories 29a, 29b are provided between the readout gate 23 and the CCD analog shift register 24. Owing to the provision of the analog memories 29a, 29b, the signal outputs OUT1, OUT2 simultaneously occur, which can eliminate a problem coming from the difference in position between the lines.

5 Claims, 6 Drawing Sheets

S1 > S2

T1 > T2

G1 > G2

LINEAR IMAGE SENSOR DEVICE COMPRISING FIRST AND SECOND LINEAR IMAGE SENSOR SECTIONS HAVING FIRST AND SECOND SENSITIVITIES

BACKGROUND OF THE INVENTION

1. Field of the Invention

The present invention relates to a linear image sensor device, and more particularly to a linear image sensor device with at least two line structures which can cover a wide dynamic range.

2. Description of the Related Art

A linear sensor is made such that its signal output varies linearly in relation to the quantity of the incident light. However, if the incident light quantity exceeds a given constant value, the signal output becomes constant, with the result that a sufficient signal output is unobtainable in the case of inputted information with a wide dynamic range. More specifically, if the incident exposure is set to match with a light portion of an object, the signal output taking place due to a dark portion thereof becomes small. On the contrary, if the incident exposure is set to match with the dark portion, the signal output due to the light portion comes into a saturated condition and assumes the same level. In other words, the dynamic range to the incidence of light is small.

For this reason, it is appropriate to provide a linear sensor device which does not show the linear relation between the incident light quantity and its signal output, for example, which has a logarithm characteristic. However, considerable technical difficulty is experienced to realize a linear sensor device with the logarithm characteristic, and hence it is not practicable. Thus, it has been desired to develop a linear sensor device having a wide dynamic range but being relatively low in the degree of technical difficulty.

SUMMARY OF THE INVENTION

Accordingly, it is an object of the present invention to provide a linear image sensor device which is capable of having a relatively simple structure and covering a wide dynamic range.

A linear image sensor device according to the present invention has at least a two line arrangement, each line including a sensor element array, a readout gate for reading out signal charges produced through the photoelectric conversion by this sensor element array, a charge transfer register for transferring the signal charges read out through the readout gate, and an output section for converting the signal charges transferred from the charge transfer into electric signals. In this linear image sensor device, for the position-related correction between the lines, an analog memory is provided between the readout gate and the charge transfer register, and the lines have different sensitivities.

More specifically, in this linear image sensor device thus arranged, since the signal outputs of the respective lines are information spatially separated from each other due to the positional separation between the lines, for the line being in a state preceding in time, the signal charges read out from the sensor element array through the readout gate are temporarily stored in the analog memory, thus accomplishing the positional correction between the lines. With this arrangement, the signal outputs of the respective lines become information existing at the spatially same position. Besides, since being different in sensitivity, these lines produce picture outputs with different sensitivity with respect to the incident light quantity. Moreover, the signal output of the line with a high sensitivity is used in the case of a small incident light quantity, whereas the signal output of the line with a low sensitivity is employed in the case of a large incident light quantity, which can widen the dynamic range relative to the light incidence.

That is, in accordance with the present invention, a linear image sensor device comprises a first linear sensor section including a plurality of first pixels to output first electric signals each of which corresponds to a quantity of incident light coming from an object, and further having a first sensitivity to the incident light, and a second linear sensor section disposed adjacent to the first linear sensor section and including a plurality of second pixels to output second electric signals each of which is equivalent to the incident light, said second linear sensor section having a second sensitivity higher than said first sensitivity, with the first linear sensor section preceding to the first linear sensor section in subscanning the object, and the first linear sensor section further including a delay circuit to delay the outputting of the first electric signals.

Preferably, the delay circuit is provided such that the first electric signal and the second electric signal both taking place due to the same portion of the object are outputted at the same time. In addition, the linear image sensor device further comprises a selector for selectively outputting the first and second electric signals in accordance with a level of the second electric signals. Moreover, the linear image sensor device further comprises a comparator for comparing the level of the second electric signals with a standard level to output a control signal to the selector.

Furthermore, in a linear image sensor device according to this invention, a first linear sensor section includes a plurality of first pixels each producing a first charge which corresponds to incident light from an object, a first shift register for transferring the first charges produced in the first pixels, a first readout gate provided between the first pixels and the first shift register, a memory provided between the first readout gate and the first shift register, and a first output region for converting the first charge into a first electric signal, and a second linear sensor section includes a plurality of second pixels each producing a second charge which corresponds to the incident light, a second shift register for transferring the second charges produced in the second pixels, a second readout gate provided between the second pixels and the second shift register, and a second output region for converting the second charge into a second electric signal. In this instance, the first linear sensor section has a first sensitivity to the incident lights and the second linear sensor section has a second sensitivity different from the first sensitivity.

Preferably, scanning by the first linear sensor section precedes that of the second linear sensor section in subscanning the object, while the second sensitivity is higher than said first sensitivity. In addition, the memory is provided such that the first electric signal and the second electric signal both taking plate due to the same portion of the object are outputted at the same time. More preferably, the linear image sensor device further comprises a selector for selectively outputting the first and second electric signals in accordance with a level of the second electric signals, and a comparator for comparing the level of the second electric signals with a standard level to output a control signal to the selector.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

A detailed description will be made hereinbelow of an embodiment of the present invention with reference to the drawings.

Figure 1:
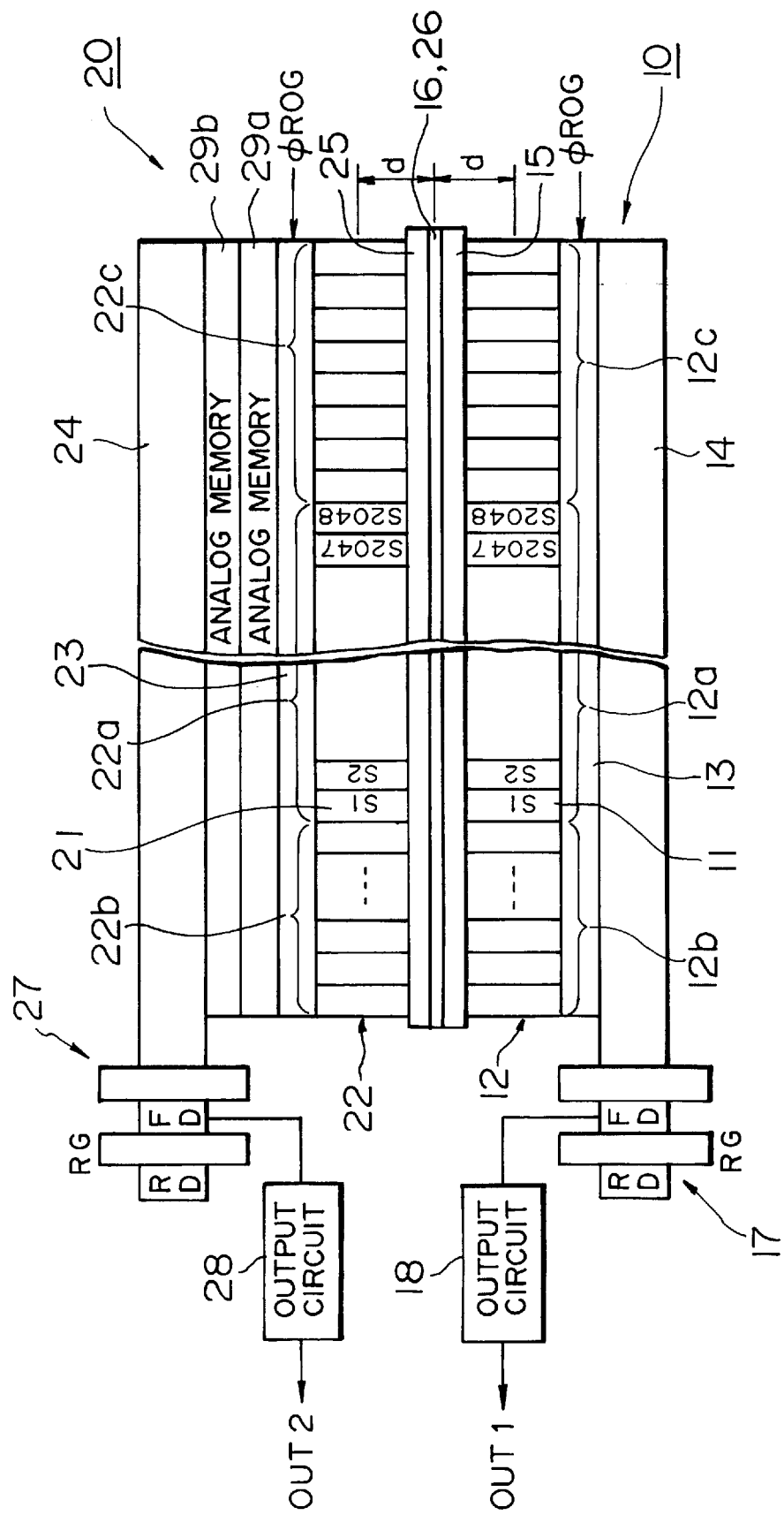
FIG. 1 is an illustration of a structure of a linear image sensor device according to an embodiment of the present invention.

FIG. 1 shows a linear image sensor device with a two-line structure according to an embodiment of this invention. In FIG. 1, a first linear sensor 10 is composed of a sensor array 12 consisting of a number of photoelectric conversion portions (pixels) 11 arranged linearly. In addition, in one side of the sensor array 12 there are placed a readout gate 13 for reading out charges produced through the photoelectric conversion in the respective photoelectric conversion portions 11 and a charge transfer register (which will be referred hereinafter to as a CCD analog shift register) 14 for charges read out are transferred in order through the CCD analog shift register 14 and then converted into a signal voltage in the charge voltage conversion section 17 and further led to the output circuit 18 to result in being a signal output OUT1. At this time, the signal charges overflowed from the overflow gate 15 are dumped into the overflow drain 16.

On the other hand, a second linear sensor 20, as well as the first linear sensor, has a sensor array 22 comprising photoelectric conversion portions 21 arranged linearly and an overflow gate 25 and an overflow drain 26 placed in one side of the sensor array 22. In addition, in terms of the sensor array 22, the second linear sensor 20 is disposed to be in axisymmetrical relation to the first linear sensor 10 in a state where the overflow drain 26 is interposed therebetween. In this case, the overflow drain 26 is also used as the overflow drain 16 of the first linear sensor 10. Further, in the other side of the sensor array 22, there are located a readout gate 23, analog memories 29a, 29b constructed as line memories, and a CCD analog shift register 24.

In this second linear sensor 20, the signal charges from the respective photoelectric conversion portions 21 of the sensor array are read out through the readout gate 23 in such a manner that a readout gate pulse ϕROG is transferring signal charges read out by the readout gate 13. Further in the other side of the sensor array 12, there are located an overflow gate 15 and an overflow drain 16.

The sensor array comprises an effective pixel section 12a corresponding to, for example, 2048 pixels (S1 to S2048) and invalid pixel sections 12b, 12c each corresponding to a plurality of pixels and situated at the front and rear sides of the effective pixel section 12a. The invalid sections 12b, 12c are so-called optical black (OPB) sections, the light-receiving surface sides of the respective photoelectric conversion portions 11 of which shut out light. At a transferring side end portion of the CCD analog shift register 14 there is provided a charge voltage conversion section 17 constructed, for example, as a floating diffusion amplifier. This charge voltage conversion section 17 organizes an output section together with an after-stage output circuit 18 comprising an amplifier or the like.

In the first linear sensor 10 thus constructed, the signal charges from the respective photoelectric conversion portions 11 of the sensor array 12 are read out by the readout gate 13 in such a manner that a readout gate pulse ϕROG is applied to the readout gate 13, and fed to the CCD analog shift register 14. Further, the signal applied to the readout gate 23, and temporarily stored in the analog memory 29a and further in the analog memory 29b and, thereafter, read out to the CCD analog shift register. Accordingly, since the analog memories 29a, 29b are line memories, the signal charges from the sensor array 22 are read out by the CCD analog shift register 24 with a delay or lag corresponding to 2 lines.

Assuming that the widths of the sensor arrays 12, 22 are taken as d and the total width of the overflow gates 15, 25 and the overflow drains 16 (26) interposed between the sensor arrays 12, 22 is taken to be approximately d, the distance between the sensor centers of the sensor arrays 12, 22 assumes approximately 2d. Under this positional condition, when the direction perpendicular to the sensor arrays is set to the subscanning direction and the sensor array 22 precedes to the sensor array 12, at a certain time the sensor arrays 12, 22 read out information existing at the positions spatially separated from each other by the distance of 2d.

For the width scanning, the preceding linear sensor 20 is equipped with the analog memories 29a, 29b so that the signal charges from the sensor array 22 are delayed by the quantity corresponding to two lines and read out to the CCD analog register 24, and therefore the respective signal charges read out to the CCD analog shift registers 14, 24 at a certain time develop the information existing at the spatially same position even if the sensor arrays 12, 22 are separated by the distance 2d from each other. In addition, the signal charges read out to the CCD analog shift register 24 are transferred in order through the shift register 24 and then converted into a signal voltage in the charge voltage conversion section 27 and further outputted as a signal output OUT2 from the output circuit 28.

The signal output OUT2 of this second linear sensor 20 can occur simultaneously with the signal output OUT1 of the first linear sensor 10 by the help of the effects of the operations of the aforesaid analog memories 29a, 29b. Although in this embodiment the two analog memories 29a, 29b are provided to delay the signal charges from the sensor array 22 by the quantity corresponding to two lines and then to make the readout thereof to the CCD analog shift register 24, it is also possible that the overflow gates 15, 25 and the overflow drain 16 are omitted so that the sensor arrays 12, 22 are disposed adjacent to each other. In this case, since the distance between the sensor centers of the sensor arrays 12, 22 assumes d, if the analog memory is provided corresponding to only one line, the signal outputs OUT1 and OUT2 can take place simultaneously with each other.

Figure 2:
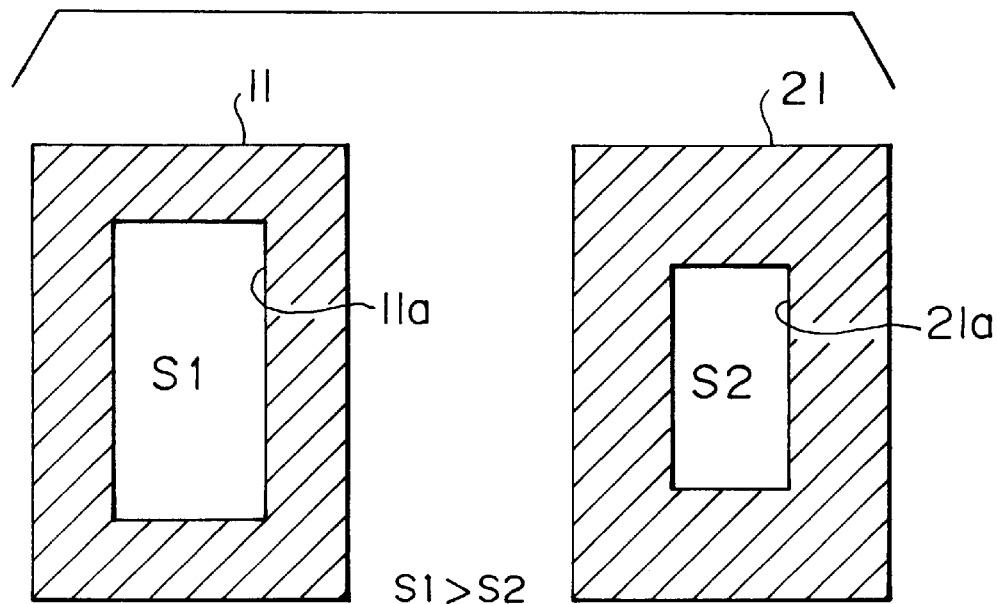
FIG. 2 is an illustration useful for describing a structure in the case of changing an sensor opening area between lines.

In the linear image sensor device with the two line structure described above, the lines have sensitivities different from each other. As one example, of the first and second linear sensors 10, 20, the second linear sensor 20 preceding at the scanning time is made to have a lower sensitivity, while the first linear sensor 10 following it is made to have a higher sensitivity. As the methods of making different sensitivities between the lines, roughly there are a method of providing different sensitivities to the sensor arrays of the first and second linear sensors 10, 20 and a method of providing different sensitivities to the output sections thereof. A concrete description will be taken hereinbelow of the methods of setting different sensitivities between the lines. The description will begin with the method of setting the different sensitivities between the sensor arrays 12, 22 of the first and second linear sensors 10, 20. As one example, there is a method of making the difference between the opening areas to opening portions 11a, 21a of the photoelectric conversion sections (sensor sections 11, 21) of the sensor arrays 12, 22. That is, as shown in FIG. 2 the opening area of the opening portion 11a of the photoelectric conversion section (sensor section) 11 of the sensor array 12 is set to S1 and the opening area of the opening portion 21a of the photoelectric conversion section 21 of the sensor array 22 is set to S2, with the relation between the opening areas being S1>S2. Owing to this relation, the quantity of light incident on the photoelectric conversion section 11 becomes larger than the quantity of light incident on the photoelectric conversion section 21, so that the sensitivity of the sensor array 12 becomes higher than the sensitivity of the sensor array 22. As a result, the first linear sensor 10 shows a high sensitivity while the second linear sensor 20 has a low sensitivity.

Figure 3:
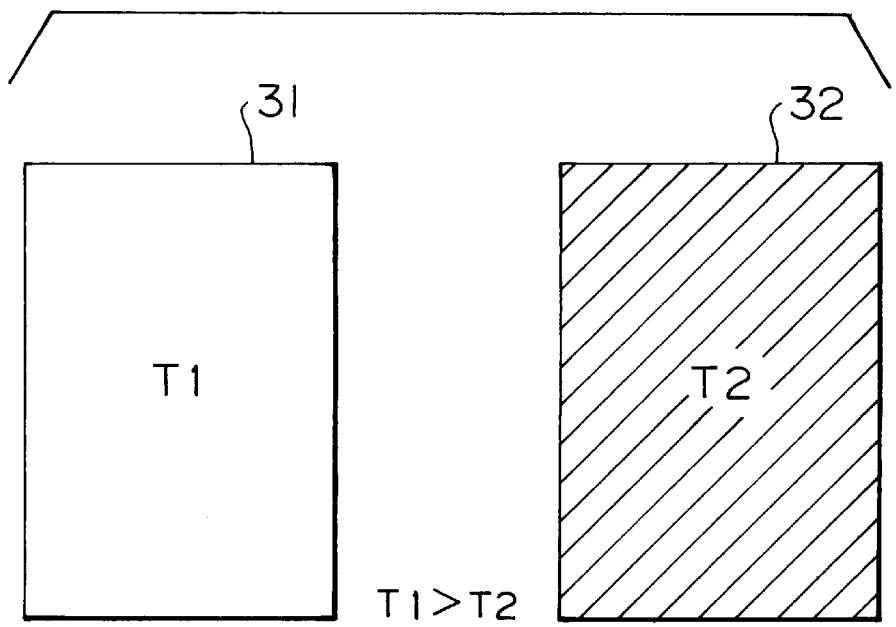
FIG. 3 is an illustration of useful for explaining a structure in the case of changing the transmittance of an optical filer between lines.

As another way, there is a method of making a difference in transmittance or transmission factor between optical filters placed on the photoelectric conversion sections 11, 21 of the sensor arrays 12, 22. More specifically, in FIG. 3 the transmittance of an optical filter 31 in the photoelectric conversion section 11 side is set to T1 while the transmittance of an optical filter 32 in the photoelectric conversion section 21 side is set to T2. In this instance, the relation therebetween is T1>T2. In the case of establishing this relation, the quantity of light incident on the photoelectric conversion section 11 becomes larger than the quantity of light incident on the photoelectric conversion section 21 so that the sensitivity of the sensor array 12 exceeds the sensitivity of the sensor array 22. As a result, the first linear sensor 10 has a high sensitivity whereas the second linear sensor 20 has a low sensitivity. The transmittances T1, T2 of the optical filters 31, 32 are changeable in such a way as to alter the film thickness of the respective filters 31, 32. Although in this embodiment the optical filters are respectively placed on both the photoelectric conversion sections 11, 21, it is also appropriate that no optical filter is placed on the photoelectric conversion section 11 with the high sensitivity whereas an optical filter with a low transmittance is located on only the photoelectric conversion section 21 with the low sensitivity.

Figure 4:
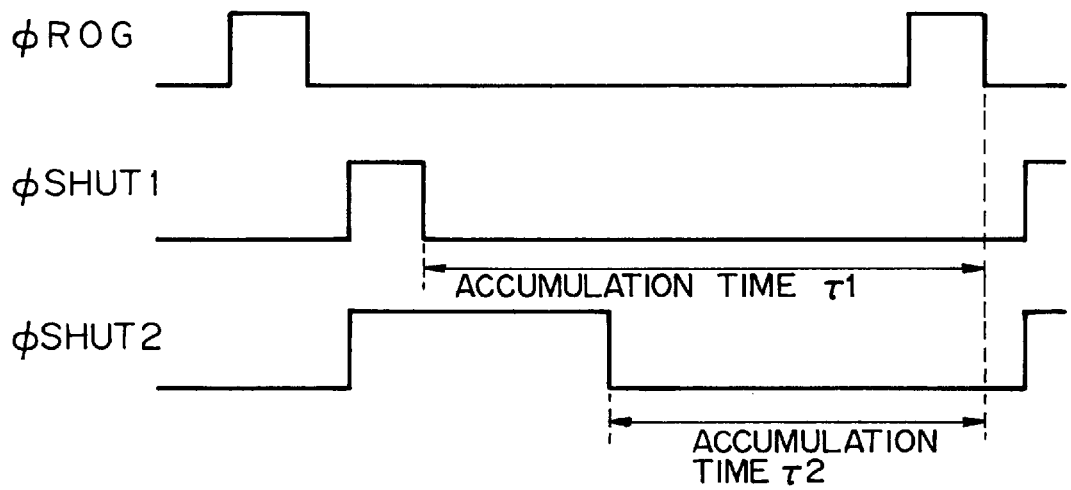
FIG. 4 is a timing chart showing the case of changing the accumulation time between lines.

As a different way, there is a method of using the overflow gates 15, 25 and the overflow drain 16 (26) as electronic shutters. More specifically, it is a method to change the accumulation times $\tau 1, \tau 2$ of the signal charges of the sensor arrays 12, 22 in a manner of applying shutter pulses $\phi$SHUT1, $\phi$HUT2 to the overflow gates 15, 25 as shown in a timing chart of FIG. 4. When these accumulation times $\tau 1, \tau 2$ are set to satisfying the relation of $\tau 1 > \tau 2$, the amount of the signal charges accumulated in the photoelectric conversion section 11 of the sensor array 12 becomes larger than the amount of the signal charges accumulated in the photoelectric conversion section 21 of the sensor array 22, so that the sensitivity of the sensor array 12 becomes higher than the sensitivity of the sensor array 22, with the result that the first linear sensor 10 has a high sensitivity whereas the second linear sensor 20 has a low sensitivity.

Although in this embodiment the difference between the accumulation times $\tau 1$ and $\tau 2$ of the sensor arrays 12, 22 creates the difference in sensitivity between the sensor arrays 12, 22, even if the accumulation time in the sensor array 12 with a high sensitivity is set to an ordinary time and only the accumulation time in the sensor array 22 with a low sensitivity is changed, the difference in sensitivity between the sensor arrays 12, 22 can take place. Thus, in the case of using the overflow gates 15, 25 and the overflow drain 16 (26) as an electronic shutter, it is possible to omit the overflow gate 15 and the overflow drain 16 in the high sensitivity side.

Figure 5:
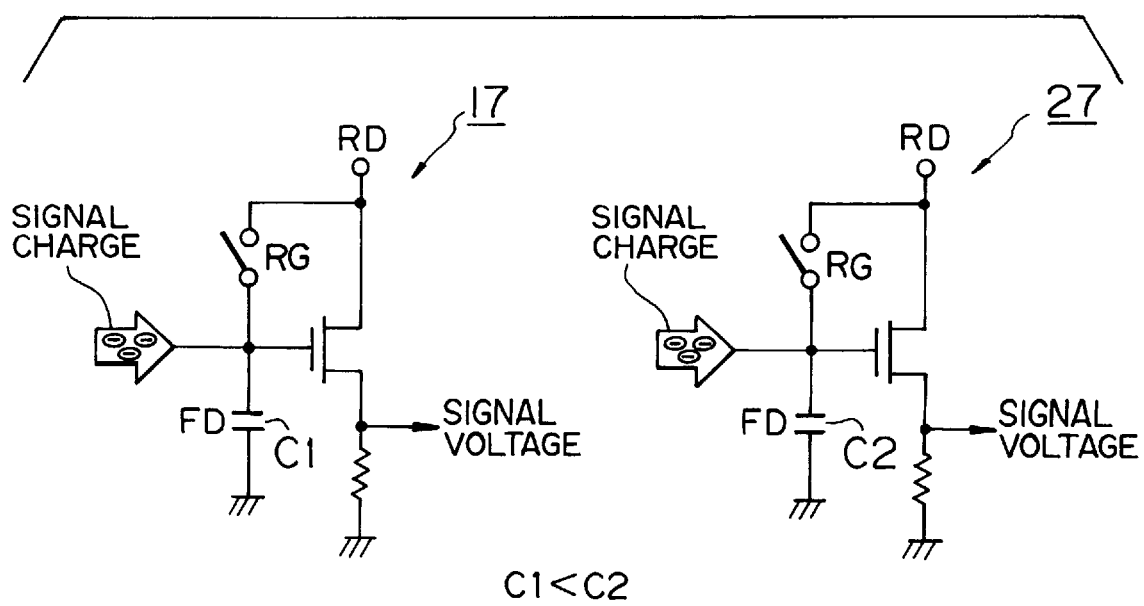
FIG. 5 is an illustration of equivalent circuits in the case of changing an FD capacity between lines.

Moreover, a description will be made hereinbelow of a method of making a difference in sensitivity between the output sections of the first and second linear sensors 10, 20 to cause a difference in sensitivity between the lines. As one example, there is a method of making a difference in conversion efficiency between the charge voltage conversion sections 17, 27 for the purpose of creating the difference in sensitivity between the output sections. FIG. 5 shows equivalent circuits in the case of, for example, using floating diffusion amplifier as the charge voltage conversion sections 17, 27. In this instance, the following relational expression is satisfied among the capacity C of the FD (floating Diffusion) of the charge voltage conversion sections 17, 27, the signal charge Qsig and the signal voltage Vsig after the conversion.

Vsig=Qsig/C

When the capacity of the FD of the charge voltage conversion section 17 is taken to be C1 and the capacity of the FD of the charge voltage conversion section 27 is taken as C2, the FD capacities of the charge voltage conversion sections 17, 27 are set to take the relation of C1<C2. Owing to this relation between the FD capacities, the conversion efficiency of the charge voltage conversion section 17 becomes higher than the conversion efficiency of the charge voltage conversion section 27, and therefore the sensitivity of the output section of the first linear sensor 10 is superior to the sensitivity of the output section of the second linear sensor 20, with the result that the first linear sensor 10 has a high sensitivity and the second linear sensor 20 has a low sensitivity.

Figure 6:
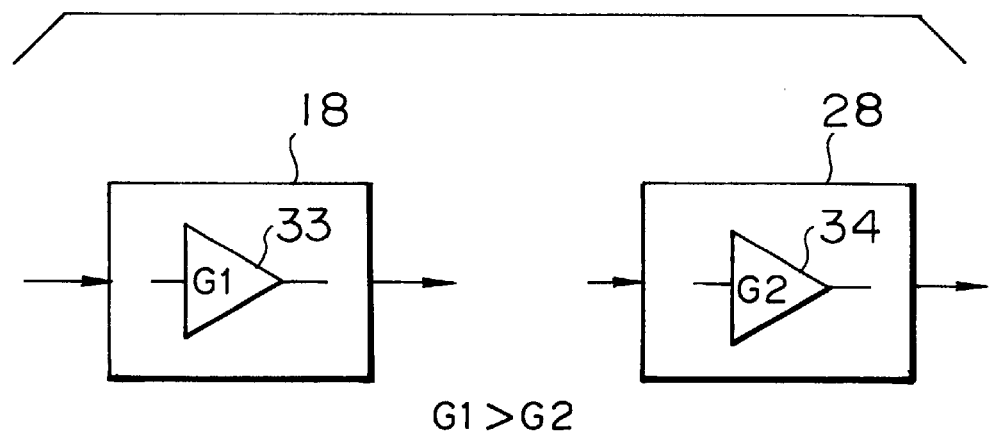
FIG. 6 is an illustration of circuits for changing a gain of an amplifier between lines

As a further way to make a difference in sensitivity between the output sections, there is a method of making a difference in gain between the output circuits 18, 28. That is, when as shown in FIG. 6 the gain of a built-in amplifier 33 of the output circuit 18 is taken to be G1 and the gain of an built-in amplifier 34 of the output circuit 28 is taken as G2, the relation between the gains thereof is made to be G1>G2. Due to this relation, if the levels of the signal inputs to the output circuits 18, 28 are the same, the signal output OUT1 of the output circuit 18 becomes higher in level than the signal output OUT2 of the output circuit 28, and therefore the sensitivity of the output section of the first linear sensor 10 is superior to the sensitivity of the output section of the second linear sensor 20, with the result that the first linear sensor 10 has a high sensitivity and the second linear sensor 20 has a low sensitivity.

Figure 7A:
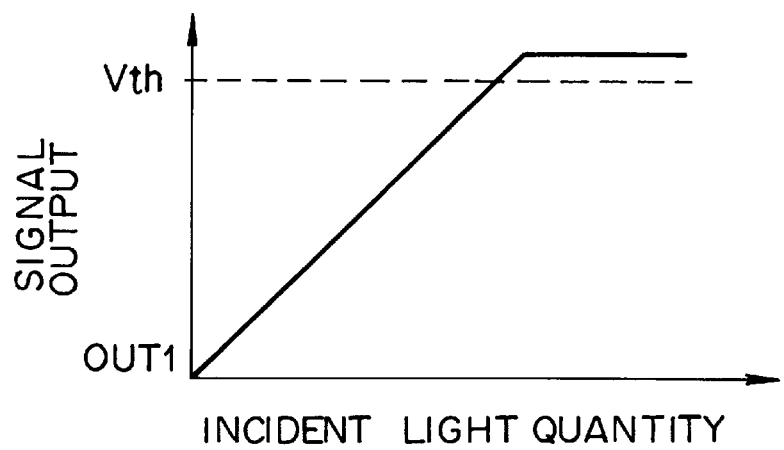
FIGS. 7A and 7B illustrate signal output characteristics with respect to an incident light quantity in the case that lines have a high sensitivity and a low sensitivity.
Figure 7B:
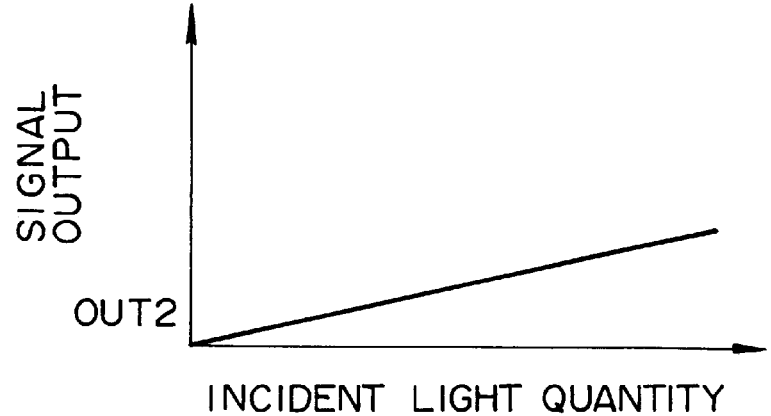

As described above, in the linear image sensor device, the respective signal outputs OUT1, OUT2 of the first and second linear sensors 10, 20 are made to simultaneously take place through the operations of the analog memories 29a, 29b and the difference in sensitivity between the lines is made, so that the signal outputs OUT1, OUT2 different in sensitivity with respect to the incident light quantity are obtainable. That is, in terms of the signal output OUT1 of the first linear sensor 10, as shown in FIG. 7A the signal output varies linearly with respect to the light quantity until the incident light quantity reaches some value and comes into a saturated condition to assume a constant level after it reaches that value. On the other hand, in terms of the signal output OUT2 of the second linear sensor 20, as shown in FIG. 7B the signal output varies linearly at a small inclination relative to the light quantity.

Figure 8:
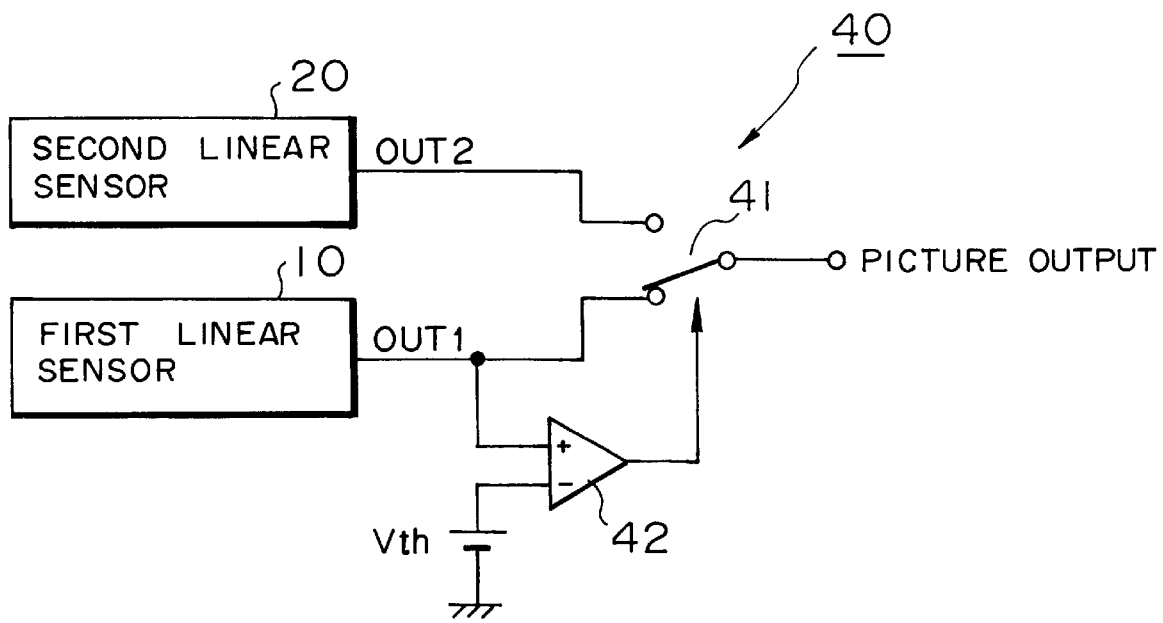
FIG. 8 is an illustration of an example of an arrangement of a signal processing circuit.

The signal outputs OUT1, OUT2 different in sensitivity are selectively outputted by a signal processing circuit 40 which will be described later to produce a picture output. That is, in the signal processing circuit 40 as shown in FIG. 8, the respective signal outputs OUT1, OUT2 of the first and second linear sensors 10, 20 are inputted as two inputs to a selection switch 41. The selection switch 41 ordinarily chooses the signal output OUT1 of the first linear sensor 10 to produce a picture output using the signal output OUT1. Further, the signal output OUT1 of the first linear sensor 10 is compared with a threshold level Vth in a comparator 42. This threshold level Vth is set to have a level slightly lower than the saturation level of the signal output OUT1. The comparator 42 distinguishes between the saturated area and the non-saturated area of the signal output OUT1 by comparing the signal output OUT1 of the first linear sensor 10 with the threshold level Vth and judges the fact that the signal output OUT1 is in the saturated condition when the signal output OUT1 exceeds the threshold level Vth and controls the switching operation of the selection switch 41.

Accordingly, the selection switch 41 selects the signal output OUT2 of the second linear sensor 20 as a picture output in place of the signal output OUT1 of the first linear sensor 10 immediately before the signal output OUT1 of the first linear sensor 10 comes to the saturated area. That is, in the area in which the incident light quantity is relatively small so as not to cause the saturation of the signal output OUT1 with a high sensitivity, the signal output OUT1 is chosen as the picture output. On the other hand, in the area where the incident light quantity is relatively large to cause the saturation of the signal output OUT1 with a high sensitivity, the signal output OUT2 with a low sensitivity is chosen as the picture output. This can enlarge the dynamic range relative to the light incidence.

Furthermore, the analog memories 29a, 29b are disposed in the second low sensitivity linear sensor 20 side and the second linear sensor 20 is placed to precede to the first linear sensor 10 with a high sensitivity in the subscanning direction, and the second linear sensor 20 with a low sensitivity is used in the area in which the incident light quantity is large. Thus, the second linear sensor 20 is not exposed to the influence from the dark current noises occurring in the analog memories 29a, 29b as compared with the first linear sensor 10 with a high sensitivity, and hence the picture output with an excellent S/N ratio is attainable.

In this embodiment, the pixels (S1, S2, . . . , S2048) of the sensor array are more preferably disposed to take the same position between the lines in the array direction (main scanning direction). However, they are not always required to take the same position, and even if they shift within the range of the pixel pitch in the main scanning direction, there is no problem in the picture quality. Further, although in this embodiment the linear image sensor device has a two-line structure, this invention is not limited to this two-line structure. This invention is also applicable to a structure with three or more lines, and if the sensitivities of the lines are more finely set, it is possible to provide a linear image sensor device in which the characteristic of the signal output to the incident light quantity becomes closer to the logarithm characteristic and which has a simpler structure.

Figure 9:
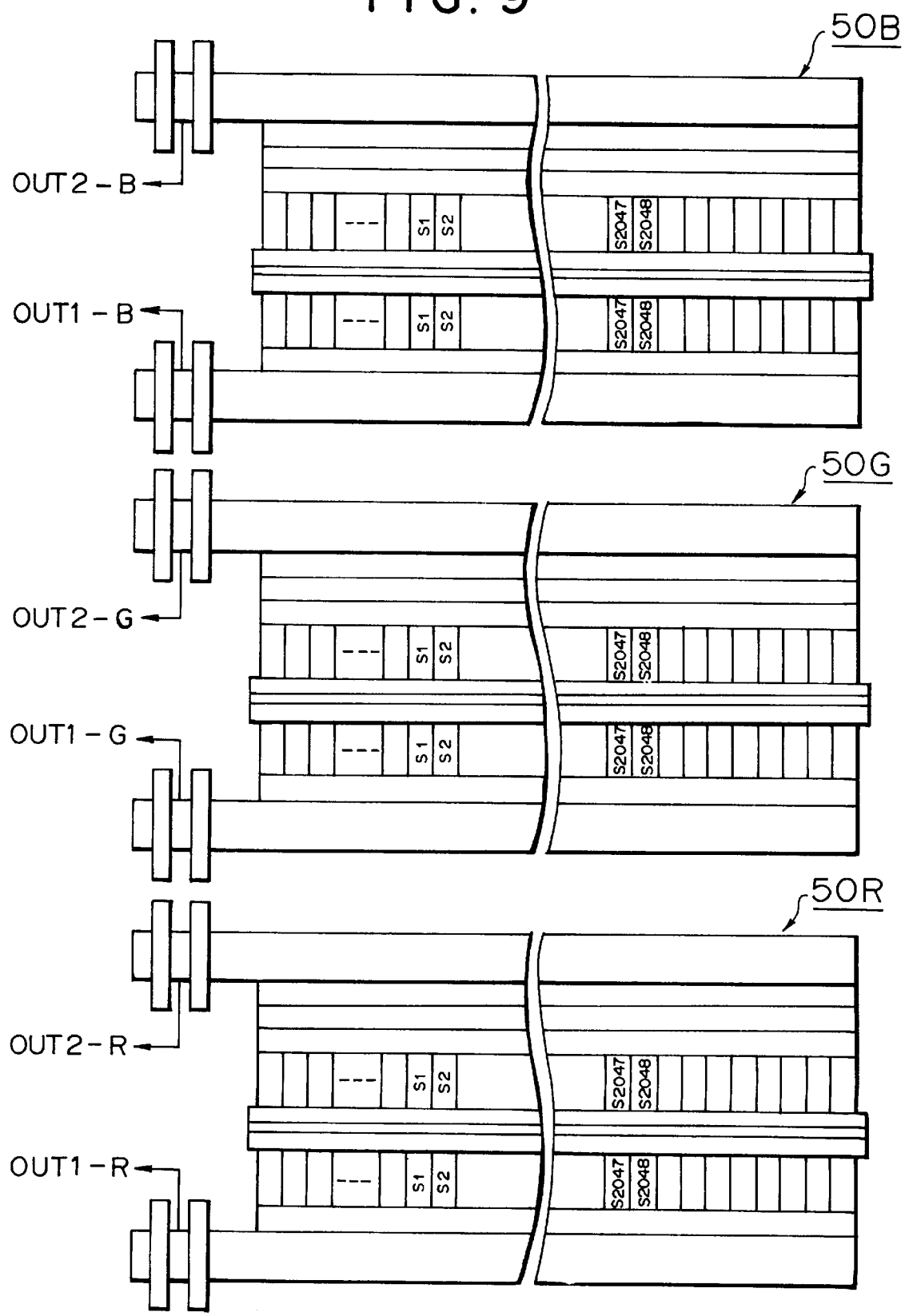
FIG. 9 is an illustration of a structure in which this invention is applied to a color linear sensor device.

FIG. 9 shows a structure taken in the case that this invention is applied to a color linear image sensor device. In FIG. 9, three color linear sensors 50B, 50G and 50R are provided corresponding to B (blue), G (green) and R (red). These color linear sensors 50B, 50G and 50R involves the linear sensor as shown in FIG. 1, that is, have the analog memories for the positional correction between the lines and have different sensitivities between the lines. However, in this case, because they are color linear sensors, this structure differs from the structure of FIG. 1 in that color filters corresponding to the respective colors are placed on the light receiving surfaces of the sensor arrays.

As described above, according to the present invention, in a linear image sensor device with at least two lines, the analog memories are provided for the positional correction between the lines and the signal outputs of the lines are made to simultaneously occur and further the lines has different sensitivities. Accordingly, the picture outputs different in sensitivity with the incident light quantity between the lines are obtainable. Thus, when the incident light quantity is large, the signal output of the line with a high sensitivity is employed, and when the incident light quantity is small, the signal output of the line with a low sensitivity is put to use, which can enlarge the dynamic range in relation to the light incidence.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. A linear image sensor device comprising:
    a first linear sensor section including a plurality of first pixels, said first linear sensor section outputting first electric signals each of which corresponds to a quantity of incident light coming from an object, and further having a first sensitivity to said incident light; and
    a second linear sensor section disposed adjacent to said first linear sensor section, said second linear sensor section including a plurality of section pixels and outputting second electric signals each of which is equivalent to said incident light, said second linear sensor section having a second sensitivity higher than said first sensitivity;
    wherein said first linear sensor section precedes said second linear sensor section in subscanning said object, and said device further includes a delay circuit to delay the outputting of one of said first and second electric signals, and wherein a selector selects the second electric signals as a primary output signal of said device and selects the first electric signals when the second electric signals are at or above a saturation level.

2. A linear image sensor device according to claim 1, wherein said delay circuit is provided such that said first electric signal and said second electric signal contain information from the same portion of said object.

3. A linear image sensor device comprising:
    a first linear sensor section including a plurality of first pixels each producing a first charge which corresponds to incident light from an object, a first shift register for transferring said first charges produced in said first pixels, a first readout gate provided between said first pixels and said first shift register, a memory provided between said first readout gate and said first shift register, and a first output region for converting said first charge into a first electric signal, said first linear sensor section having a first sensitivity to said incident lights; and a second linear sensor section including a plurality of second pixels each producing a second charge which corresponds to said incident light, a second shift register for transferring said second charges produced in said second pixels, a second readout gate provided between said second pixels and said second shift register, and a second output region for converting said second charge into a second electric signal, said second linear sensor section having a second sensitivity higher than said first sensitivity, wherein said first linear sensor section precedes said second linear sensor section in subscanning said object.

4. A linear image sensor device according to claim 3, further comprising a selector for selectively outputting said first and second electric signals in accordance with a level of said second electric signal.

5. A linear image sensor device according to claim 4, further comprising a comparator for comparing the level of said second electric signal with a standard level to output a control signal to said selector.

* * * * *